Aug. 3, 1937.　　　J. A. PORTEOUS　　　2,088,922
PIPE CONSTRUCTION
Filed July 27, 1934
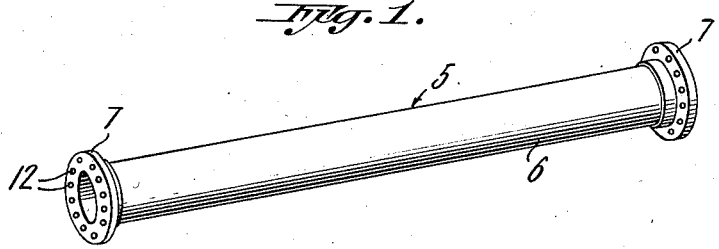
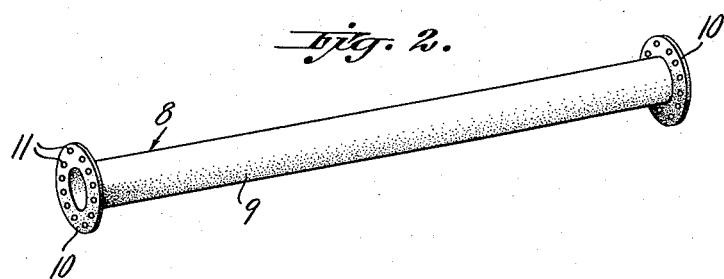
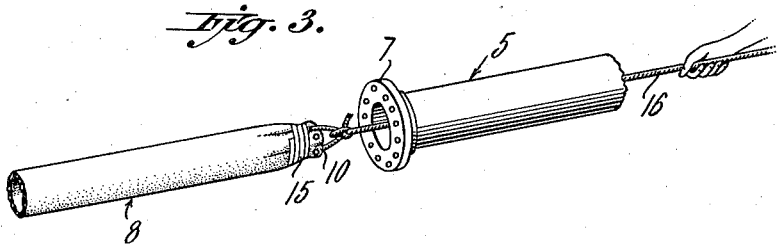
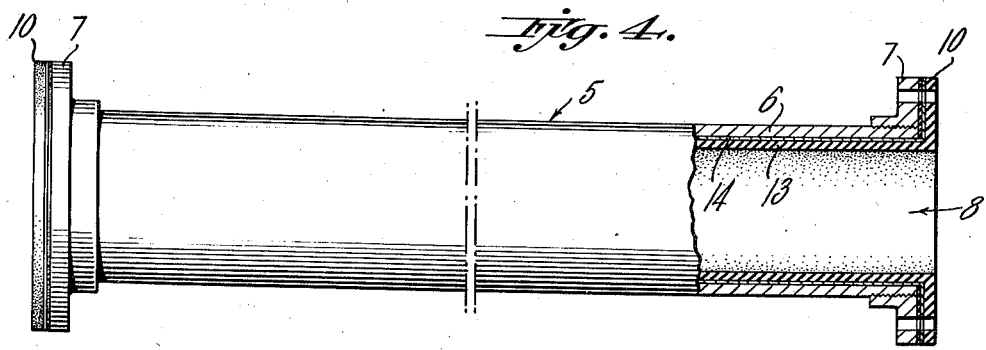
INVENTOR
JOHN A. PORTEOUS
BY
ATTORNEY Patented Aug. 3, 1937

2,088,922

UNITED STATES PATENT OFFICE 2,088,922

PIPE CONSTRUCTION

John A. Porteous, Montreal, Quebec, Canada, assignor, by mesne assignments, to United States Rubber Company, New York, N. Y., a corporation of New Jersey Application July 27, 1934, Serial No. 737,142

5 Claims. (Cl. 138—64)

This invention relates to an improved pipe construction having a removable abrasion and corrosion resistant lining.

In conveying abrasive and corrosive materials such as mineral ore pulp, sand, acids and like materials through iron pipe they cut holes in the pipe. In order to protect the inner walls of the pipe from the action of these materials the pipe has been lined with a rubber or rubber containing material. The linings heretofore used or proposed have been fixed to the inside walls of the pipe to prevent them from creeping along the length of the pipe due to the flow of the materials through the pipe, and the linings have been so constructed that it was either impracticable to place them in the pipe at the place of use or specially constructed longitudinally split pipes were required to encase the linings.

An object of this invention is to provide an improved pipe construction comprising a standard length of pipe and a pipe lining adapted to resist internal abrasion and corrosion and which may be readily removed from the pipe and a new lining reinserted therein at the place of use.

The above and other objects and novel features of this invention will be more clearly understood from the following description and the accompanying drawing, in which:

Fig. 1 is a standard pipe length having flanges on each end thereof;

Fig. 2 is a preformed pipe lining adapted to be inserted in the pipe shown in Fig. 1;

Fig. 3 is a portion of one end of the pipe and a portion of an end of the pipe lining 8 in position to be drawn into the pipe; and Fig. 4 is a side view of an assembled pipe construction disclosing an embodiment of this invention in which the lining and the pipe are shown in section at one end.

Referring to the drawing the assembled pipe construction shown in Fig. 4 comprises a standard pipe length 5 having an integral body portion 6 and a flange 7 secured to each end of the body in which a pipe lining 8 is inserted. The body portion 9 of the lining is not cemented or otherwise attached to the body portion of the pipe 6 but is secured in the pipe by the engagement of flanges 10 on each end of the lining with the flanges 7 on the pipe 5.

The lining 8 is made to conform to the inside walls and flanges of the pipe 5 before it is inserted therein, and the flanges 10 of the lining are also formed with bolt holes 11 to match with the bolt holes 12 in the pipe flanges 7. The lining is preferably formed of a tube of rubber or rubberized material 13 which is vulcanized to an outer duck or cord fabric case 14 which reinforces the inner tube material. The lining 8 is formed in one piece and after being vulcanized in the usual manner it is flexible but yet self supporting and conforms to the pattern of the inside of the pipe 5 and flanges 7 of the pipe as shown in Fig. 2 when inserted in the pipe.

The lining 8 may be inserted in the pipe 5 by the method illustrated in Fig. 3. The lining flanges 10 are sufficiently flexible that they can be bent outwardly and folded to substantially the size of or smaller than the internal diameter of the pipe into which it is to be inserted. One of the flanges 10 is so folded and is wrapped with tape 15 or the like to hold it in the folded position. A means such as a rope 16 for fishing the lining into the pipe is run through the pipe and tied into the bolt holes 11 in the lining flange 10, and the lining is drawn into the pipe 5 until the opposite lining flange 10 strikes the corresponding pipe flange 7. The folded flange 10 which has been pulled through the pipe is then released by removing the rope 16 and the tape 15 and the lining flange is allowed to expand against the pipe flange. The body 9 of the lining being held in the pipe by the engagement of the lining flanges 10 with the pipe flanges 7 it is thereby secured in the pipe and is able to resist the tendency of the flow of materials therein to cause the lining to creep along the walls of the pipe.

Since no special equipment is required to insert the lining in the pipe and since the body of the lining is not attached to the inside walls of the pipe, the lining can readily be inserted in the pipe at its place of use and can readily be removed and replaced when the old one is worn out.

An embodiment of this invention has been described but it will be understood that changes in the details as shown and described herein may be made without departing from the scope of the invention as defined in the appended claims.

Having thus described my invention, what I claim and desire to protect by Letters Patent is:

1. A pipe construction comprising a pipe length having an integral body portion and having a flange disposed at each end of its body; a removable lining having a body portion disposed in but not adhered to said pipe body; said lining having a flange secured at each end of its body and engaging said flanges on said pipe and thereby acting as the principal means for securing the lining in said pipe length.

2. A pipe construction comprising a pipe length having an integral body portion and having a flange disposed at each end of its body; a preformed flexible removable lining having a self-supporting body portion disposed in but not adhered to said pipe body; said liner having a flange preformed on each end of its body and engaging said flanges on said pipe and thereby acting as the principal means for securing the lining in said pipe length.

3. A pipe construction comprising a pipe length having an integral body portion and having a flange disposed at each end of its body; a flexible rubberized lining having a body portion disposed in but not attached to said pipe body; said lining having a flange secured at each end of said body and engaging said flanges on said pipe for securing the lining in position.

4. A pipe construction comprising a pipe length having an integral body portion and having a flange disposed at each end of its body; a removable lining having a body portion disposed in said pipe body and not adhered to the inner walls thereof; said lining being composed of reinforced rubber material and having a flange secured at each end of said body and engaging said flanges on said pipe for securing the lining in position.

5. A pipe construction comprising a pipe length having an integral body portion and having a flange disposed at each end of its body; a removable lining having a body portion disposed in said pipe body and not adhered to the inner walls thereof; said lining being composed of rubber material reinforced with a casing of fabric on its outside walls, and having a flange secured at each end of said body and engaging said flanges on said pipe and thereby acting as the principal means for securing the lining in position.

JOHN A. PORTEOUS.